US008545655B2

(12) United States Patent
Koike

(10) Patent No.: US 8,545,655 B2
(45) Date of Patent: Oct. 1, 2013

(54) METHOD FOR PRODUCING PRINT

(75) Inventor: Yoshifumi Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 1323 days.

(21) Appl. No.: 12/336,103

(22) Filed: Dec. 16, 2008

(65) Prior Publication Data

US 2009/0165934 A1 Jul. 2, 2009

(30) Foreign Application Priority Data

Dec. 27, 2007 (JP) ................................ 2007-335878

(51) Int. Cl.
*B32B 37/00* (2006.01)

(52) U.S. Cl.
USPC .......................................................... 156/182

(58) Field of Classification Search
USPC .......................................................... 156/182
See application file for complete search history.

(56) References Cited

U.S. PATENT DOCUMENTS

| | | | | |
|---|---|---|---|---|
| 4,837,200 | A * | 6/1989 | Kondo et al. | 503/227 |
| 5,267,755 | A * | 12/1993 | Yamauchi et al. | 283/86 |
| 5,496,072 | A * | 3/1996 | Yamauchi et al. | 283/86 |
| 6,184,181 | B1 * | 2/2001 | Lum et al. | 503/227 |
| 7,419,716 | B2 * | 9/2008 | Tian et al. | 428/156 |
| 2003/0099007 | A1 * | 5/2003 | Towner et al. | 358/520 |
| 2004/0154481 | A1 * | 8/2004 | Hayashi et al. | 101/34 |
| 2004/0241416 | A1 * | 12/2004 | Tian et al. | 428/304.4 |
| 2007/0116933 | A1 * | 5/2007 | Kobayashi et al. | 428/172 |

FOREIGN PATENT DOCUMENTS

| | | |
|---|---|---|
| JP | 59-076298 | 5/1984 |
| JP | 59-085793 | 5/1984 |
| JP | 60-204397 | 10/1985 |
| JP | 61-197282 | 9/1986 |
| JP | 62-198497 | 9/1987 |
| JP | 63-087286 | 4/1988 |
| JP | 64-027996 | 1/1989 |
| JP | 07-052428 | 2/1995 |
| JP | 09-272266 | 10/1997 |
| JP | WO97/39898 | 10/1997 |
| JP | 2001-287390 | 10/2001 |
| JP | 2003-320622 | 11/2003 |
| JP | 2005-262863 | 9/2005 |

OTHER PUBLICATIONS

Japanese Office Action issued on Jan. 31, 2012 in connection with counterpart JP Application No. 2007-335878.
Specular Glossiness—Methods of Measurement, Japanese Standards Association, English version of Japanese Industrial Standard Z8741 (1997).

* cited by examiner

*Primary Examiner* — Mark Ruthkosky
*Assistant Examiner* — Sathavaram I Reddy
(74) *Attorney, Agent, or Firm* — Dentons US LLP

(57) ABSTRACT

A method for producing a print includes a step of thermally bonding a thermally transferrable image-protecting layer onto an image surface of an image-receiving sheet so as to form a protective layer. In this step, thermal energy applied is changed so that the resulting protective layer has a first glossy region and a second glossy region having a glossiness lower than that of the first glossy region. The first glossy region has a glossiness a, which is a 20° mirror-surface glossiness measured according to Japanese Industrial Standard Z8741. The second glossy region has a glossiness b, which is a 20° mirror-surface glossiness measured according to Japanese Industrial Standard Z8741. The value obtained by subtracting the glossiness b from the glossiness a is 60 or more.

4 Claims, 6 Drawing Sheets

METHOD FOR PRODUCING PRINT

CROSS REFERENCES TO RELATED APPLICATIONS

The present invention contains subject matter related to Japanese Patent Application JP 2007-335878 filed in the Japanese Patent Office on Dec. 27, 2007, the entire contents of which are incorporated herein by reference.

BACKGROUND OF THE INVENTION

1. Field of the Invention

The present invention relates to a method for producing a print.

2. Description of the Related Art

Images formed on objects such as printing paper, in particular, images formed by a sublimation thermal transfer process using a sublimation dye or a thermally diffusible dye, have been laminated with transparent films to protect the surfaces of the images.

The image protecting functions desired for the transparent films vary widely and include following: to block gas that causes image deterioration, to prevent changes in color of the images by imparting a ultraviolet (UV) absorbing function to the transparent films, to impart plasticizer resistance so that the dyes forming images are prevented from migrating into various plasticizer-containing articles such as erasers, to impart wear resistance, and to impart resistance to sebum.

There also exist various methods for lamination with transparent films.

Examples of such lamination methods include a method for thermocompressing a transparent film onto an image surface by using a hot roller and a method for bonding a transparent film on an image surface with an adhesive at room temperature.

Japanese Unexamined Patent Application Publication Nos. 60-204397, 59-85793, and 59-76298 describe a method for forming an image-protecting layer (i.e., transparent film) on an image, in which a transfer-type image-protecting film constituted by a base film and an image-protecting layer composed of a thermoplastic resin and disposed on the base film is prepared and the image-protecting layer of the transfer-type image-protecting film is thermally transferred onto the image to be protected so as to form the image-protecting layer.

According to the transfer-type image-protecting film described above, only the portion of the image-protecting layer that has been heated during thermal transfer is laminated on the image to be protected. Thus, curling of the printing paper after lamination can be suppressed.

Moreover, it is also possible to form the image-protecting layer in an ink ribbon used for image formation so that the image-protecting layer can be laminated continuously after image formation in a printer.

Japanese Unexamined Patent Application Publication Nos. 61-197282 and 62-198497 propose a supporting member in which a plastic film is bonded to a core material layer such as paper and a supporting member in which a biaxially stretched film (synthetic paper) including voids (gaps) mainly composed of a thermoplastic resin such as polyolefin resin is bonded to a core material layer such as paper.

However, although image-receiving sheets incorporating these supporting members have good heat insulation and flat/smoothness, they lack paper-like texture and are costly.

In the cases where a paper sheet is used as the supporting base of the image-receiving sheet, the cushioning property is slightly improved from when a film is used as the base although the sensitivity is insufficient as with the case of using a film. However, nonuniformity in density of paper fibers causes nonuniformity in adhesion between an ink ribbon and the image-receiving layer, and this causes nonuniformity in density of the printed image.

In order to overcome these inconveniences, Japanese Unexamined Patent Application Publication Nos. 64-27996 and 63-87286 provide an image-receiving sheet in which an intermediate layer containing hollow particles is interposed between a sheet-shaped supporting member made of paper or the like and an image-receiving layer.

Of these, an image-receiving sheet that uses a supporting film system in which a plastic film is bonded to a core material layer such as paper has good heat insulation and flat/smoothness. However, heat and pressure applied during sheet-conveying and image-printing in a printer create dents in the image-receiving sheet, thereby impairing the appearance.

Another problem is the high cost of the foamed film. In order to control the thickness of the whole image-receiving sheet to a predetermined thickness, a thick foamed film is desirably used, but this is economically disadvantageous. Also, the texture of the resulting image-receiving sheet is different from that of printing paper used for silver halide photos.

An example of technique for processing an image surface of printing paper into a desired pattern such as a matt pattern is to use a transfer-type laminate film. For example, the transfer-type laminate film may be constituted by a base member having a matt-finished surface and a protective layer (laminate layer) formed on the matt-finished base member by application.

For example, such a transfer-type laminate film may be used by superimposing the transfer-type laminate film on an image surface (surface on which the image is formed) of a printing paper (in the case where the image is formed by dye sublimation thermal transfer, the transfer-type laminate film is formed on a dye image-receiving layer), thermally compressing the laminate film onto the printing paper, and then detaching the base member.

In this manner, the surface asperity of the base member is transferred onto the surface of the protective layer transferred onto the printing paper. Thus, the image surface of the printing paper is imparted a matt texture.

However, in the case where a transfer-type laminate film is used to impart a desired pattern to the surface of a transparent film laminated on the image surface of the printing paper, the desired pattern is desirably preliminarily formed on the surface of the base member during production of the transfer-type laminate film. This increases the production cost.

In recent years, a technique that can easily improve and modify the tone of a print has been developed (for example, refer to Japanese Unexamined Patent Application Publication No. 7-52428 and World Patent Application (PCT) Publication WO97/039898 (transfer originating from Japan). According to this technique, in thermally transferring, with a thermal head, an image-protecting layer onto an image recording surface after formation of the image, thermal energy from the thermal head is adequately changed so as to form the protective layer and impart a desired texture (silk-, matt-, or gloss-finish, for example) to the surface of the protective layer simultaneously.

However, it has been found that this method faces following challenges during forming an image on a base sheet and during laminating an image-protecting layer and simultaneously patterning the surface.

The challenges that exist during formation of images on the base member sheet are as follows.

In the cases where an image-receiving sheet uses a supporting base/film system in which a plastic film is bonded to a core material layer such as paper, the texture of the resulting print is different from that of printing paper for silver halide photos. The image-receiving sheet incorporating the supporting base/film system is usually disadvantageous in terms of cost.

Thus, in order to obtain a print that has a texture similar to that of the silver halide photos and is advantageous in terms of cost, a supporting member prepared by sequentially laminating a hollow particle-containing layer and an image-receiving layer on a paper supporting base is used. Compared to the cases where the supporting base is constituted by a film, the texture of the print is improved and the resulting print has a texture similar to that of silver halide photos.

However, when high thermal energy is applied in laminating the image-protecting layer, the intermediate layer containing the hollow particles thermally swell in the region where the heat is applied, a desired clear glossiness difference pattern is rarely obtained, and the quality of the print may be degraded.

In recent years, in order to comply with high speed printing, a recording method with a higher conveying rate per line is being developed.

In such a case, in order to shorten the time for forming images and time for forming the image-protecting layer, the conveying rate during image formation and the conveying rate during image-protecting layer formation are increased as much as possible.

In the cases where the image-forming layer is formed at an ever higher conveying rate, the pattern that creates differences in surface glossiness and that is formed during the image-protecting layer transfer becomes less clear compared to the case where the conveying rate of the image-receiving sheet is not as high.

SUMMARY OF THE INVENTION

Although a print having a halide photo-like texture can be obtained by using paper in the supporting base member, a desired pattern with clear differences in glossiness is rarely formed and quality of the resulting print is degraded since the intermediate layer containing hollow particles thermally swell in a region onto which high energy is applied during lamination of the image-protecting layer.

According to an embodiment of the present invention, the thermal energy applied during lamination of the image-protecting layer is adjusted to obtain a clear difference in surface glossiness.

A method for producing a print according to an embodiment of the present invention includes a step of thermally bonding a thermally transferrable image-protecting layer onto an image surface of an image-receiving sheet so as to form a protective layer. In this step, thermal energy applied is changed so that the resulting protective layer has a first glossy region and a second glossy region having a glossiness lower than that of the first glossy region. The first glossy region has a glossiness a, which is a 20° mirror-surface glossiness measured according to Japanese Industrial Standard Z8741, and the second glossy region having a glossiness b, which is a 20° mirror-surface glossiness measured according to Japanese Industrial Standard Z8741. The value obtained by subtracting the glossiness b from the glossiness a is 60 or more.

According to the above-described method, because the difference (a−b) between the glossiness a and the glossiness b is 60 or more, visual asperities can be easily imparted to the resulting print. In other words, the pattern for creating the difference in surface glossiness can be clearly formed during transfer of the image-protecting layer. Thus, clear differences in surface glossiness can be achieved.

DESCRIPTION OF THE PREFERRED EMBODIMENTS

An embodiment of a method for making a print will now be described with reference to drawings.

Figure 2:
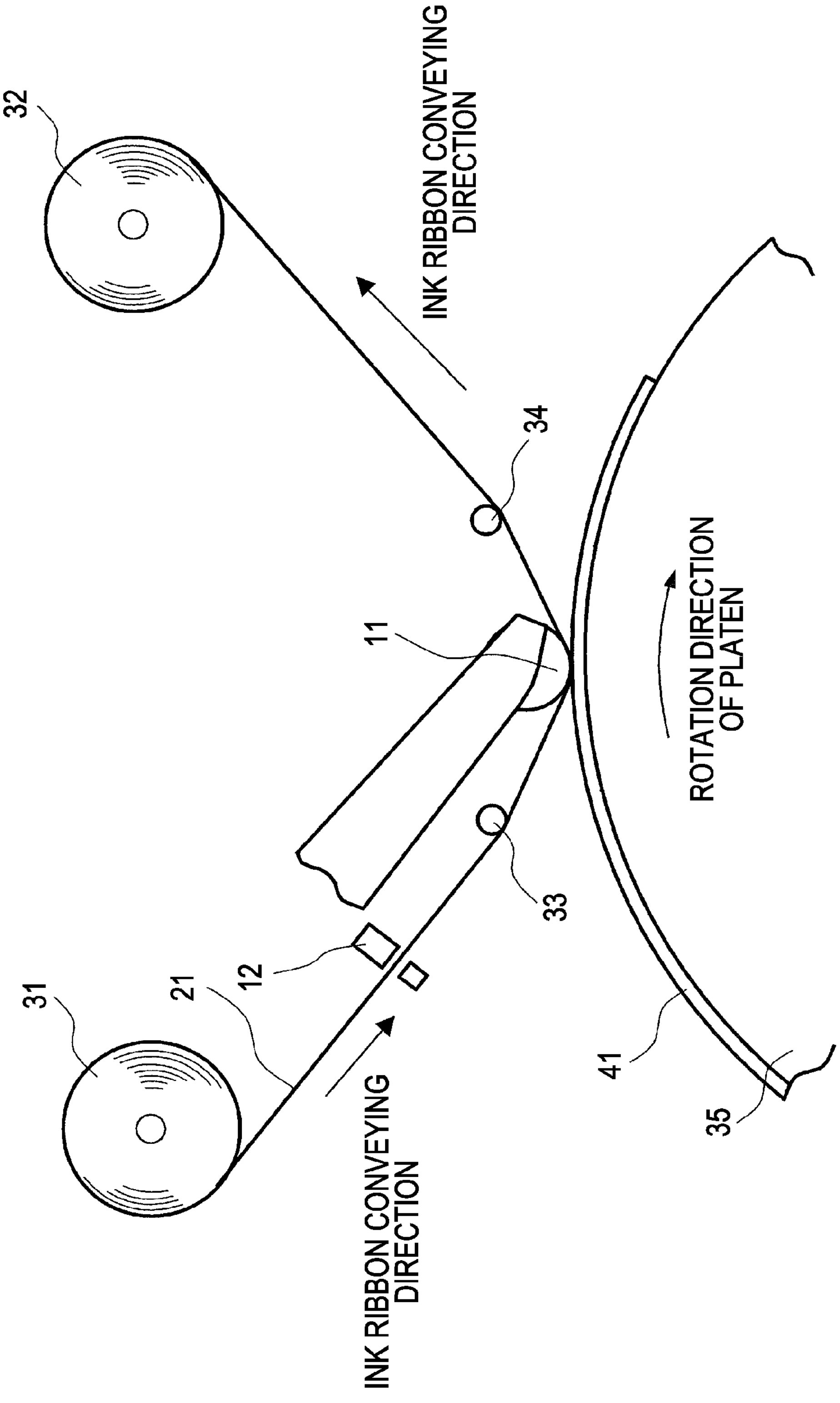
FIG. 2 is a schematic diagram showing one example of a main printing unit of a printing apparatus used for implementing a method for producing a print according to an embodiment.

First, a main printing unit of a printing apparatus used for implementing the method of the embodiment is described by referring to a schematic diagram in FIG. 2.

As shown in FIG. 2, the main printing unit includes a supply reel 31 for supplying a thermal transfer sheet (hereinafter also referred to as “ink ribbon”) 21 and a winding reel 32 that winds the ink ribbon 21. The main printing unit also includes guide rollers 33 and 34 for guiding the ink ribbon 21 to a printing position. A thermal transfer head 11 that forms a printing position is disposed between the guide rollers 33 and 34.

The main printing unit also includes a platen 35 that rotates and conveys an image-receiving sheet (hereinafter also referred to as “printing paper”) 41 to the printing position corresponding to the thermal transfer head 11.

Examples of details of the main printing unit having the above-described configuration will now be described.

The ink ribbon 21 wound about the supply reel 31 is taken up by the winding reel 32 driven and rotated by a driving motor (not shown) while the ink ribbon 21 is being supported by the guide rollers 33 and 34.

A torque limiter (not shown) is provided to the supply reel 31, for example, to give a back tension to the ink ribbon 21 at a particular torque.

The winding reel 32 is provided with a winding detection encoder including an optical sensor (not shown), for example.

An yellow dye, a magenta dye, and a cyan dye in amounts sufficient for one page of printing are applied to the ink ribbon 21, for example, each dye being applied as a line having a particular length.

Moreover, as described below, a page top mark and a wind diameter mark are applied on the ink ribbon 21 at the head position of a group of dyes corresponding to one page. A color identification mark indicating the color of dye is also applied at the head position of each dye line.

In this manner, an optical sensor 12 disposed in the travelling path of the ink ribbon 21 detects the page top mark and the color identification mark so that the head position of each dye line of the ink ribbon 21 is determined on the basis of the results of detection.

A head unit having the thermal transfer head 11 is detachably attached to one end of a pressurizing lever rotatably supported on a rotating shaft, although this is not shown in the drawing. The other end of the pressurizing lever is swingablly attached to a cam plate through a link. Accordingly, the head unit moves up and down as the cam plate is rotatably driven by a head driving motor. Due to this structure, the thermal transfer head 11 is positioned at an intermediate position from which the head unit can be moved either up or down, an initial position, above the intermediate position, at which the head unit parts from the ribbon, or a lowest position, below the intermediate position, at which the head unit abuts the printing paper 41.

Due to this structure, the head unit moves to the initial position at the time of mounting the ink ribbon 21 or the like and to the lowest position at the time when the printing paper 41 is placed on the platen 35.

The movement and position of the head unit are detected with an optical sensor disposed near a notch of the cam plate, for example. The thermal transfer head 11 is of an edge-type and abuts the printing paper 41 via the ink ribbon 21 in the entire width direction of the printing paper 41.

As a result, as the printing paper 41 is moved in the arrow direction, a desired image is printed over the entire surface of the printing paper 41.

An image is printed on the printing paper 41 with a printing apparatus including the above-described main printing unit to thereby obtain a print.

A process for forming an image on a printing paper will now be described.

Figure 3:
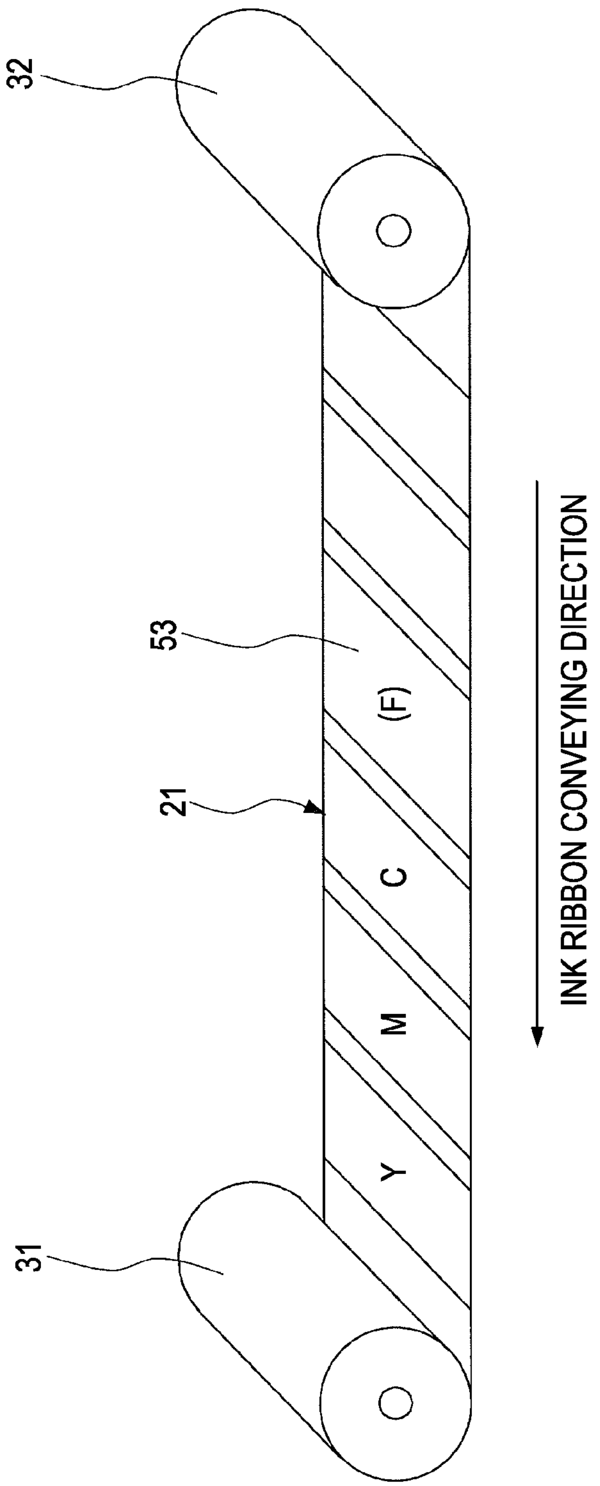
FIG. 3 is a schematic view showing an example of an ink ribbon.

As shown in FIG. 3, an ink ribbon having a repeating pattern constituted by an yellow ink layer Y, a magenta ink layer M, a cyan ink layer C, and an image-protecting layer (F) 53 arranged in that order from the winding side (the winding reel 32 side) toward the supply side (the supply reel 31 side) is used as the ink ribbon 21 in this printing apparatus, for example.

As the printing apparatus having the main printing unit described with reference to FIG. 2 is operated, yellow, magenta and cyan images are sequentially thermally transferred in that order by sublimation onto the image-receiving layer (printing surface) on the surface of the printing paper. Then the image-protecting layer 53 having a predetermined pattern is thermally transferred onto the entire surface.

At this stage, the printing apparatus (e.g., a color printer) transfers the laminate film onto the entire surface of the printing paper regardless of the color of the image.

As described above, in this color printer, lamination and formation of images of different colors are conducted in the same printing process.

Note that the composition of the image-protecting layer 53 is designed so that the image-protecting layer 53 has ability to diffuse light. The image-protecting layer 53 is thermally transferred by forming a predetermined printing pattern.

A process for printing the image-protecting layer 53 will now be described.

A color print as it is readily suffers from development of discoloration. After printing, in order to enhance lightfastness and resistance to sebum or the like, an image-protecting film (e.g., a transparent film) is formed on the surface of the color print to enhance the storage stability.

For example, as shown in FIG. 3, in the case where the ink ribbon 21 including the color ink layers (e.g., the yellow dye layer Y, the magenta dye layer M, and the cyan dye layer C) followed by the image-protecting layer 53 is used, lamination is conducted in the same process after printing in these colors is conducted by using the thermal transfer head. The ink ribbon 21 is described in detail below.

This technique involves transferring a resin thin film formed as the image-protecting layer 53 on the ink ribbon 21 onto the image by uniformly heating the resin thin film with the thermal transfer head. Lamination drastically improves the storage stability of the image and can bring the storage stability to a satisfactory level.

On the other hand, a silver halide photo is formed by optical printing; thus, images can be printed on printing papers with various surface properties. For example, visual effects such as "delustering" has been achieved by using silk-finish printing papers having regular patterns or high-grade printing papers with random asperity patterns. In halide photo technology, images can be printed on printing papers having surface asperities because images are formed optically in a noncontact manner.

As described above, an image of a silver halide photo is formed by printing an image on a printing paper having surface asperities. In contrast, for example, a dye sublimation printer that prints an image with a thermal transfer head using thermal sublimation inks forms an image by bringing the thermal transfer head into contact with the printing paper. Thus, unlike with the silver halide photo, a printing paper having surface asperities is not used. Since the printing paper has no surface asperities, the method for producing a print of this embodiment is used to achieve "delustering" effect (hereinafter referred to as "matt treatment"). The details of the method are described below.

The image-receiving sheet and the thermal transfer sheet used in the method for producing the print of this embodiment will now be described.

First, the image-receiving sheet (printing paper) is described in detail.

The image-receiving sheet (printing paper) is preferably a layered sheet including a base composed of a paper material, an intermediate layer containing hollow particles, and an image-receiving layer stacked sequentially in that order.

The intermediate layer contains hollow particles having particular physical properties and an adhesive.

The hollow particles dispersed and distributed in the intermediate layer can decrease the compressive elasticity modulus of the image-receiving sheet, can impart an adequate degree of deformability to the image-receiving sheet, and thus improve the image-receiving sheet's abilities to follow the shapes of and adhere on the thermal transfer head and the ink ribbon. Thus, even in a low energy state, the thermal efficiency of the thermal transfer head relative to the image-receiving layer is improved, the printing density of the printed image can be increased, and the image quality can be improved.

It is also possible to prevent printing failures caused by ink ribbon wrinkles under application of high energy in a high-speed printer.

The hollow particles will now be described in detail.

For example, a hollow particle is constituted by a shell composed of a polymer material and at least one hollow (pore) portion surrounded by the shell.

The method for making the hollow particles is not particularly limited. For example, following hollow particles may be used: Hollow particles formed by foaming a thermoplastic polymer material containing a thermally swellable substance under heating (hereinafter simply referred to as "foamed hollow particles"); and hollow particles obtained by making microcapsules through a microcapsule polymerization method using a polymer-forming material as a shell-forming material and a volatile liquid as a pore-forming material, and then removing the pore-forming material from the microcapsules through volatilization (hereinafter simply referred to as "microcapsule hollow particles").

The intermediate layer is preferably composed of the foamed hollow particles described above.

Foamed hollow particles may be prepared by incorporating a volatile low-melting-point hydrocarbon in a thermoplastic polymer material to prepare particles each with a shell (wall) composed of the thermoplastic polymer material and then heating the particles so as to thermally swell the thermally swellable substance and obtain a predetermined particle diameter. The volatile low-melting-point hydrocarbon may be at least one selected from n-butane, i-butane, pentane, and neopentane. The thermoplastic polymer material may be a homopolymer or copolymer of vinylidene chloride, vinyl chloride, acrylonitrile, methacrylonitrile, styrene, (meth) acrylic acid, and a (meth)acrylate, for example.

Moreover, since the foamed hollow particles have small specific gravity in general, an inorganic powder, such as calcium carbonate, talc, titanium dioxide, or the like may be adhered on the foamed hollow particle surfaces by heat-bonding to improve the dispersibility, the ease of handling, and the like. Such foamed composite hollow particles having surfaces coated with the inorganic powder and the like can also be used in this embodiment.

The microcapsule hollow particles suitable for use in the intermediate layer are obtained by a microcapsule-forming polymerization method in which microcapsules including shells (walls) composed of a polymer-forming material (shell-forming material) and cores containing a volatile liquid (pore-forming material) are dried to remove the pore-forming material by evaporation and to thereby form hollow cores.

Examples of the polymer-forming material include hard resins such as a styrene-(meth)acrylate copolymer, melamine resins, and the like. Examples of the volatile liquid include water and the like.

The average particle diameter of the hollow particles (foamed hollow particles or microcapsule hollow particles) is preferably 0.5 to 10 μm, more preferably 1 to 9 μm, and most preferably 2 to 8 μm.

If the average particle diameter of the foamed hollow particles is less than 0.5 μm, the image-receiving sheet may not sufficiently exhibit a sensitivity-improving effect since the volume hollow ratio of the hollow particles is generally low.

In contrast, if the average particle diameter exceeds 10 μm, the flat/smoothness of the resulting intermediate layer surface is degraded, uniformity of thermally transferred images may be deteriorated, and glossiness may not be sufficiently exhibited.

The average particle diameter of the hollow particles is measurable by using a common particle size analyzer. For example, a laser diffraction particle size analyzer or the like is used for measurement.

The volume hollow ratio of the hollow particles (foamed hollow particles or microcapsule hollow particles) is preferably 50% to 97% and more preferably 55% to 95%.

When the volume hollow ratio of the hollow particles is less than 50%, the image-receiving sheet as a whole does not sufficiently exhibit effects of improving the sensitivity.

At a volume hollow ratio exceeding 97%, the coating strength of the intermediate layer decreases, the intermediate layer becomes more vulnerable to damage, and appearance is degraded.

Note that the "volume hollow ratio" of the hollow particles is the ratio of the hollow portions to the volume of the particle. To be more specific, the volume hollow ratio can be determined from the specific gravity of a hollow particle dispersion containing the hollow particles and a poor solvent, the mass ratio of the hollow particles in the dispersion, the true specific density of the polymer resin forming the shells (walls) of the hollow particles, and the specific gravity of the poor solvent.

Note that the "poor solvent" means a solvent that does not dissolve or swell the resin forming the walls of the hollow particles. Examples of the poor solvent include water and isopropyl alcohol.

The average particle diameter and the volume hollow ratio of the hollow particles can also be determined from a photograph of a cross-section of the intermediate layer containing the hollow particles taken with a small-angle X-ray scattering system or the like.

The intermediate layer will now be described in detail.

The mass ratio of the hollow particles relative to the total solid content of the intermediate layer is preferably 20 mass % to 80 mass % and more preferably 25 mass % to 70 mass %.

At a mass ratio of hollow particles of less than 20 mass %, the image-receiving sheet may not sufficiently exhibit a sensitivity-improving effect. In contrast, at a ratio exceeding 80 mass %, the coating property of the intermediate layer coating solution may be degraded, a satisfactory coating surface may not be obtained, and the coating strength of the intermediate layer may be degraded.

The intermediate layer contains an adhesive resin that increases the coating strength of the intermediate layer.

Examples of the adhesive resins include, but are not limited to, water-soluble polymers such as polyvinyl alcohol resins, casein, soy protein, synthetic proteins, starch, and cellulose resins, and derivatives of these, which are favored from viewpoints of film forming ability and heat resistance.

Other examples of the adhesive resin are water-dispersible resins having low viscosity and high solid content. Examples thereof include water-dispersible resins, such as conjugated diene latexes, e.g., a styrene-butadiene copolymer and a methyl methacrylate-butadiene copolymer, and vinyl copolymer latexes, e.g., as styrene-vinyl acetate copolymer; and various other available adhesive resins in the field of coating paper, such as aqueous acrylic resins, aqueous polyurethane resins, and aqueous polyester resins.

The water-soluble polymers and the water-dispersible resins described above may be used alone or in combination of two or more.

The water-soluble polymer for the intermediate layer is preferably a polyvinyl alcohol (PVA) resin among the resins described above. A polyvinyl alcohol resin having a saponification ratio of 65% to 90% and a degree of polymerization of 200 to 1000 is more preferably used since such a polyvinyl alcohol resin decreases the moisture permeability of the image-receiving sheet and satisfactorily prevents fusion bonding of the image-receiving sheet to the ink ribbon.

The reason for favoring the use of a polyvinyl alcohol resin in the intermediate layer is as follows. Polyvinyl alcohol resins improve dispersibility of hollow particles in the coating solution for the intermediate layer and have a viscosity suitable for the coating solution for the intermediate layer. Thus, coating can be satisfactorily formed by application and a more uniform intermediate layer can be formed. Moreover, the amount of water permeation can be decreased.

The water-dispersible resin for the intermediate layer described above preferably has a lowest film-forming temperature of 0° C. or less.

If the lowest film-forming temperature exceeds 0° C., the coating may not be sufficiently formed in the intermediate layer, resulting in formation of nonuniform coating and migration of water. In other words, the moisture permeability may increase.

In contrast, at an excessively low lowest film-forming temperature, the image may suffer from increased bleeding.

Examples of the water-dispersible acrylic resin having a lowest film-forming temperature of 0° C. or less include E-377 (trade name) produced by JSR Corporation and FK4025 (trade name) produced by Chuorika Co., Ltd.

Preferably, a water-soluble polymer and a water-dispersible resin are used in combination. The blend ratio of the water-dispersible resin to the water-soluble polymer is not particularly limited. Preferably, 100 to 800 parts by mass of a water-dispersible resin is blended per 100 parts by mass of a water-soluble polymer.

If the amount of the water-dispersible resin is less than 100 parts by mass, the viscosity of the coating solution increases and a sufficiently smooth flat surface may not be obtained.

In contrast, at an amount exceeding 800 parts by mass, the film-forming ability and the heat resistance may be degraded.

At least one of various auxiliary agents such as defoaming agent, a coloring agent, a fluorescent brightener, an antistatic agent, a preservative, a dispersant, a thickner, a resin cross-linking agent, and the like may be contained in the intermediate layer if desired.

In order for the intermediate layer to exhibit desirable properties such as heat insulation, cushioning property, improved glossiness, and the like, the thickness of the intermediate layer is preferably 20 μm to 90 μm and more preferably 25 μm to 85 μm.

If the thickness of the intermediate layer is less than 20 μm, the heat insulation and cushioning property may not be sufficient, and thus the sensitivity and image quality may not be sufficiently improved.

In contrast, at a thickness exceeding 90 μm, the effects of the heat insulation and cushioning property are saturated, and further improvements in properties are not expected. Such a thickness is thus economically disadvantageous.

The thickness of the intermediate layer is preferably at least three times and more preferably at least four times the average diameter of the hollow particles contained in the intermediate layer.

When the thickness of the intermediate layer is less than three times the average diameter of the hollow particles contained in the intermediate layer, the coarse hollow particles may stick out from the intermediate layer surface, and thus may degrade the image uniformity and glossiness.

The intermediate layer containing the hollow particles has high heat insulation and cushioning property. The cushioning property can be defined by "dynamic hardness".

In general, the hardness of a thin film is determined from a strain under application of a static load in a direction perpendicular to the surface of the thin film. The dynamic hardness of the intermediate layer is a value observed by using a microhardness meter, for example. For example, the dynamic hardness can be measured by applying a load to a 115° conical depressor on the basis of the load and the depression depth of a depressor according to the following equation:

$$\text{Dynamic hardness, } DHT_{115}=3.7838\times P/h^2$$

wherein P is a load (mN) and h is a depth of depression (μm).

According to this measurement method, minute movements of a stylus-type depressor are converted to electrical signals to conduct measurement. Thus, the hardness at a desired depth of depression can be determined by adjusting the load.

The dynamic hardness of the intermediate layer of the image-receiving sheet can be determined either by preliminarily removing, with a razor, the image-receiving layer to expose the intermediate layer and then conduct measurement on the exposed intermediate layer; or by conducting measurement without having the image-receiving layer removed. Either method is applicable in this embodiment. For example, in the method for measuring the dynamic hardness without having the image-receiving layer removed, the thickness of the coating layer of the image-receiving layer may be determined in advance from a photograph of an enlarged cross-section, and the load may be set to achieve a depression depth more than or equal to the thickness of the image-receiving layer to measure the hardness.

The dynamic hardness of the intermediate layer is preferably 3.0 or less and more preferably in the range of 0.1 to 1.0.

At a dynamic hardness exceeding 3.0, the cushioning property is insufficient as the intermediate layer, and the adhesion to the thermal head may be degraded at the time of printing. Thus, the image quality may be degraded.

In contrast, at an excessively low dynamic hardness, e.g., less than 0.1, the intermediate layer may be easily damaged and ease of handling may be degraded.

In order to adjust the dynamic hardness of the intermediate layer to 3.0 or less, the following approaches may be taken. However, these approaches are not limiting.

First approach: to use thin-walled hollow particles as the hollow particles contained in the intermediate layer Under application of a load, the hollow particles deform while maintaining the hollowness. The thickness of the walls of the hollow particles is preferably 10 μm or less and more preferably 2 μm or less.

Second approach: to add a resin having a softening point of normal temperature or less to the intermediate layer containing the hollow particles The soft resin has an effect of reducing the hardness of the intermediate layer as a whole. The softening point of the resin is preferably 30° C. or less and more preferably 10° C. or less.

The intermediate layer described above preferably has a pore diameter peak in the range of 0.01 μm to 10 μm in a pore distribution measurement with a mercury intrusion porosimeter. The intermediate layer may have two or more peaks within this range.

Moreover, the accumulative pore volume in the above-described peak range is preferably in the range of 0.01 cc/g to 0.7 cc/g.

In general, it is believed that as the pore volume increases, the heat insulation and cushioning property of the intermediate layer are improved and the recording sensitivity is enhanced.

However, when the pore diameter of the peak in the pore distribution of the intermediate layer is 10 μm or more or when the accumulative pore volume in the peak region is larger than 0.7 cc/g, the coating solution may excessively penetrate the intermediate layer during formation of the image-receiving layer (or barrier layer or the like) on the intermediate layer, and thus a uniform coating layer may not be obtained.

In contrast, when the pore diameter of the peak is less than 0.01 μm or when the accumulative pore volume is less than 0.01 cc/g, the coating solution does not adequately penetrate the intermediate layer. As a result, the coating layer may become nonuniform and the bonding strength may become deficient. For example, separation of the coating layer may result from fusion-bonding of the ink ribbon or the like.

The methods for measuring the pore distribution of the intermediate layer with the mercury intrusion porosimeter will now be described. However, the method for measuring the pore distribution is not limited to these.

According to a first method, a sheet-shaped supporting member mainly composed of cellulose pulp and an intermediate layer-coated member including the sheet-shaped supporting member provided with the intermediate layer are each analyzed with a mercury intrusion porosimeter to determine the pore distribution, and the pore distribution of the intermediate layer (coating layer) is specified from the difference in pore distribution between the two members.

According to a second method, a powder obtained by scraping, with a razor, a coating layer of an intermediate layer-coated member including a sheet-shaped supporting member mainly composed of cellulose pulp and an intermediate layer coating the sheet-shaped supporting member is analyzed with a mercury intrusion porosimeter to determine the pore distribution.

According to a third method, an image-receiving sheet in which an intermediate layer, a barrier layer (optional), and an image-receiving layer are sequentially stacked on a sheet-shaped supporting member mainly composed of cellulose pulp is analyzed by removing the image-receiving layer and the barrier layer with a razor to expose the intermediate layer. A powder is obtained by scraping the exposed intermediate layer with a razor or the like and analyzed with a mercury intrusion porosimeter to measure the pore distribution.

In the third method, a photograph of an enlarged cross-section or the like may be used to confirm that the image-receiving layer and the barrier layer are removed and the intermediate layer is exposed.

There are no specific limitations as to the methods for controlling the peak range of the pore diameter and the pore volume in the peak region of the intermediate layer to desired ranges. For example, the peak range of the pore diameter and the pore volume in the peak region can be easily adjusted by selecting adequate material and average particle diameter (preferably the inner diameter) of the hollow particles contained in the intermediate layer, selecting an adequate adhesive, or setting the mass ratio or the like of the hollow particles to the adhesive to an appropriate level.

Moreover, in preparing the coating solution for the intermediate layer containing the hollow particles, the specific gravity of the coating solution is usually adjusted to 0.8 g/cm$^3$ or less and preferably 0.7 g/cm$^3$ or less.

The barrier layer will now be described in detail.

The barrier layer is preferably formed between the intermediate layer and the image-receiving layer.

In general, an organic solvent, such as toluene, methyl ethyl ketone, or the like, is used as the solvent for the coating solution for the image-receiving layer. Thus, the barrier layer functions as an effective barrier that prevents swelling and dissolution of the hollow particles that occur as a result of penetration of the organic solvent into the intermediate layer, and thereby prevents deformation and breaking of the hollow particles.

A resin that has excellent film-forming ability, prevents penetration of the organic solvent, and exhibits elasticity and flexibility is used to form the barrier layer.

Specific examples of such a resin include water-soluble resins such as starch, modified starch, hydroxyethyl cellulose, methyl cellulose, carboxymethyl cellulose, gelatin, casein, gum arabic, completely saponified polyvinyl alcohol, partially saponified polyvinyl alcohol, carboxy-modified polyvinyl alcohol, acetoacetyl-modified polyvinyl alcohol, an ethylene-vinyl alcohol copolymer, a diisobutylene-maleic anhydride copolymer salt, a styrene-maleic anhydride copolymer salt, a styrene-acrylic acid copolymer salt, an ethylene-acrylic acid copolymer salt, urea resin, urethane resin, melamine resin, and amide resin.

Water-dispersible resins are also usable. Examples of the water-dispersible resins include styrene-butadiene copolymer latexes, acrylate resin latexes, methacrylate latexes, ethylene-vinyl acetate copolymer latexes, polyester polyurethane ionomers, and polyether polyurethane ionomers.

Among these resins, a water-soluble polymer is usually preferred. For example, polyvinyl alcohols such as completely saponified polyvinyl alcohol and partially saponified polyvinyl alcohol, an ethylene-vinyl alcohol copolymer, a styrene-acrylic acid copolymer salt, or the like is particularly preferred.

Various dyes may be contained in the barrier layer. Preferably, a swellable inorganic layered compound is contained so that penetration of the solvent for coating can be prevented and bleeding of the like of thermally transferred dye images can be suppressed.

Examples of the swellable inorganic layered compound include natural clay-based minerals such as smectite minerals, mica minerals, and vermiculite minerals. In addition to the natural clay-based minerals, synthetic swellable inorganic layered compounds and processed swellable inorganic layered compounds (such as swellable inorganic layered compounds coated with silane coupling agents) are also usable.

Examples of more preferable swellable inorganic layered compounds include synthetic micas such as fluorophlogopite ($KMg_3AlSi_3O_{10}F$: produced by a fusion method or a solid phase reaction method), potassium tetrasilicic mica ($KMg_{2.5}Si_4O_{10}F_2$, produced by a fusion method), sodium tetrasilicic mica ($NaMg_{2.5}Si_4O_{10}F_2$, produced by a fusion method), sodium taeniolite ($NaMg_2LiSi_4O_{10}F_2$, produced by a fusion method), lithium taeniolite ($LiMg_2LiSi_4O_{10}F_2$, produced by a fusion method); and synthetic smectites such as sodium hectorite ($Na_{0.33}Mg_{2.67}Li_{0.33}Si_{4.0}O_{10}OH_2$ or $Na_{0.33}Mg_{2.67}Li_{0.33}Si_{4.0}O_{10}F_2$ produced by a hydrothermal reaction method or a fusion method), lithium hectorite ($Na_{0.33}Mg_{2.67}Li_{0.33}Si_{4.0}O_{10}OH_2$ or $Na_{0.33}Mg_{2.67}Li_{0.33}Si_{4.0}O_{10}F_2$ produced by a hydrothermal reaction method or a fusion method), and saponite ($Na_{0.33}Mg_{2.67}AlSi_{4.0}O_{10}(OH)_2$ produced by a hydrothermal reaction method).

Among these, sodium tetrasilicic mica is particularly preferable. Sodium tetrasilicic mica having a desired particle diameter, aspect ratio, and crystallinity is obtained by a fusion synthetic method.

The swellable inorganic layered compound preferably has an aspect ratio of 5 to 5000, more preferably an aspect ratio in the range of 100 to 5000, and most preferably an aspect ratio in the range of 500 to 5000.

At an aspect ratio less than 5, bleeding may occur in the image.

In contrast, at an aspect ratio exceeding 5000, the uniformity of the image may be impaired.

The aspect ratio (Z) is indicated by the relationship, Z=L/a, where L is the average length of the particle major axes of the swellable inorganic layered compound in water (the median diameter at 50% volume distribution measured by laser diffractometry) and a is the thickness of the swellable inorganic layered compound.

The thickness a of the swellable inorganic layered compound is determined on the basis of a photograph of a cross-section of the barrier layer taken with a scanning electron microscope (SEM) or a transmission electron microscope (TEM).

The average major axis length of the swellable inorganic layered compound is 0.1 μm to 100 μm, preferably 0.3 μm to 50 μm, and more preferably 0.5 to 20 μm.

At an average major axis length less than 0.1 μm, the aspect ratio decreases and it becomes difficult to evenly bed the swellable inorganic layered compound on the intermediate layer. Thus, bleeding in the image may not be completely prevented.

At an average major axis length exceeding 100 μm, the swellable inorganic layered compound may stick out from the barrier layer, which may create asperities in the barrier layer surface, degrade the flat/smoothness, and deteriorate the image quality.

The barrier layer may contain an inorganic dye to impart concealing ability or whiteness and improve the texture of the image-receiving sheet. Examples of the inorganic dye include white inorganic dyes and fluorescent dyes such as calcium carbonate, titanium dioxide, zinc oxide, aluminum hydroxide, barium sulfate, silicon dioxide, aluminum oxide, talc, kaolin, diatomaceous earth, and satin white.

The barrier layer is preferably formed by using an aqueous coating solution.

In order to prevent swelling and dissolution of the hollow particles, the aqueous coating solution preferably does not contain an excessively large amount of an organic solvent. Examples of the organic solvent include ketone solvents such as methyl ethyl ketone; ester solvents such as ethyl acetate; lower alcohol solvents such as methyl alcohol and ethyl alcohol; hydrocarbon solvents such as toluene and xylene; and high-boiling-point high-polarity solvents such as dimethylformamide (DMF) and cellosolve.

The solid content in the coating solution for the barrier layer is preferably in the range of 0.5 $g/m^2$ to 8 $g/m^2$, more preferably 1 $g/m^2$ to 7 $g/m^2$, and most preferably 1 $g/m^2$ to 6 $g/m^2$.

When the solid content in the coating solution for the barrier layer is less than 0.5 $g/m^2$, the resulting barrier layer may not completely cover the intermediate layer surface, and the effect of preventing penetration of the organic solvent may become insufficient.

In contrast, it is not economically advantageous to have a solid content exceeding 8 $g/m^2$, since the effect of coating is saturated. Moreover, since the barrier layer becomes excessively thick, the intermediate layer may not fully exhibit the heat insulation effect and cushioning property, and the image density may decrease.

The image-receiving layer will now be described in detail.

The image-receiving sheet has an image-receiving layer disposed on the barrier layer.

The image-receiving layer may be an existing dye thermal transfer image-receiving layer.

The resin constituting the image-receiving layer is preferably a resin that has high affinity with the dye transferred from the ink ribbon, i.e., a resin that has good dyeing affinity.

Examples of such resins having high dye affinity include polyester resins, polycarbonate resins, polyvinyl chloride resins, vinyl chloride-vinyl acetate copolymer resins, polyvinyl acetal resins, polyvinyl butyral resins, polystyrene resins, and polyacrylate resins; cellulose-derived resins such as cellulose acetate butyrate; thermoplastic resins such as polyamide resins; and active-energy radiation curable resins. These resins preferably have functional groups (e.g., a hydroxyl group, an amino group, a carboxyl group, and an epoxy group) that can react with cross-linking agents used.

The image-receiving layer contains a cross-linking agent such as a polyisocyanate compound so that the image-receiving layer is prevented from being fusion-bonded with the ink ribbon under heating by the thermal head during printing and that the resin having dye affinity is three dimensionally cross-linked.

In addition, the image-receiving layer may further contain at least one of a cross-linking agent other than the polyisocyanate compound, a releasing agent, a lubricant, and other appropriate additives.

If desired, the image-receiving layer may contain at least one of a fluorescent dye, a plasticizer, an antioxidant, a pigment, a filler, a UV absorber, a photostabilizer, an antistatic agent, and other appropriate agents.

These additives may be mixed with the image-receiving-layer-forming components before application or may be provided as separate coating layers on at least one of the upper surface and the lower surface of the image-receiving layer.

The image-receiving layer can be formed by dissolving or dispersing additives such as a releasing agent, a resin having dye affinity, and the like in an organic solvent to prepare a coating solution for the image-forming layer, applying this solution onto a barrier layer disposed on a sheet-shaped supporting member with an existing coater, drying the applied solution, and, if necessary, heat-aging the dried solution.

The solid content in the coating solution for the image-forming layer is in the range of 1 $g/m^2$ to 12 $g/m^2$ and more preferably 3 $g/m^2$ to 10 $g/m^2$.

When the solid content is less than 1 $g/m^2$, the image-receiving layer may not completely cover the barrier layer surface. As a result, the image quality may be degraded, and the image-receiving layer may adhere to the ink ribbon under heating with the thermal transfer head (trouble of fusion bonding).

In contrast, it is not economically advantageous to have a solid content exceeding 12 $g/m^2$, since the effect of coating is saturated. Moreover, since the coating film strength of the image-receiving layer becomes deficient and the image-receiving layer becomes excessively thick, the intermediate layer may not fully exhibit the heat insulation effect and the image density may decrease.

A back layer will now be described in detail.

The image-receiving sheet may be provided with a back layer mainly composed of a polymeric resin at the back of the sheet-shaped supporting member (at the side opposite the image-receiving layer).

The back layer mainly composed of a polymeric resin has improved bonding strength with the supporting member and is effective for improving the print conveying property of the image-receiving sheet, preventing damage of the image-receiving layer surface, and preventing a dye from migrating from an image-receiving layer surface to the back layer.

Examples of such a resin include acrylic resins, epoxy resins, polyester resins, phenolic resins, alkyd resins, urethane resins, melamine resins, and polyvinyl acetal resins; and cured products of these resins.

The back layer may contain an appropriate cross-linking agent such as a polyisocyanate compound, an epoxy compound, or the like, to improve the adhesiveness of the back layer to the sheet-shaped supporting member.

The back layer preferably contains an organic filler or an inorganic filler as a friction coefficient adjustor.

Examples of the organic filler include a nylon filler, a cellulose filler, a urea resin filler, a styrene resin filler, and an acrylic resin filler.

Examples of the inorganic filler include silica, barium sulfate, kaolin, clay, talc, heavy calcium carbonate, precipitated calcium carbonate, titanium oxide, and zinc oxide.

The back layer may contain a conductive agent such as a conductive polymer or a conductive inorganic dye to improve the print conveying property and prevent static electricity.

A cation-type conductive polymer compound (e.g., polyethylenimine, a cationic monomer-containing acryl polymer, a cation-modified acrylamide polymer, and cationic starch) is preferably used as the conductive polymer.

If necessary, the back layer may contain an agent for preventing fusion bonding, such as a releasing agent, a lubricant, or the like.

Examples of the releasing agent include silicone compounds such as unmodified or modified silicone oil, silicone block copolymers, and silicone rubbers. Examples of the lubricant include phosphate compounds, fatty acid ester compounds, and fluorine compounds. The back layer may further contain other available agents such as a defoaming agent, a dispersant, a colored pigment, a fluorescent dye, a fluorescent pigment, a UV absorber, and the like.

The solid content in the coating solution for the back layer is preferably in the range of 0.3 g/m$^2$ to 10 g/m$^2$. More preferably, the solid content is in the range of 1 g/m$^2$ to 8 g/m$^2$.

At a solid content less than 0.3 g/m$^2$, the back layer may not be able to sufficiently prevent the image-receiving sheet from being damaged by scratching. Moreover, the image-receiving sheet may have degraded travelling property.

It is not economical advantageous to have a solid content exceeding 10 g/m$^2$, since the effect is saturated.

The image-receiving sheet can be calendered or casted to reduce asperities in the image-receiving layer surface and make the surface smooth and flat. Calendering and casting may be conducted after application of the intermediate layer, application of the barrier layer, or application of the image-receiving layer.

The calendering apparatus used for calendering, the nip pressure, the number of nips, the surface temperature of metal rollers, and the like are not particularly limited. The pressure during calendering is preferably 0.5 MPa to 50 MPa and more preferably 1 MPa to 30 MPa.

The casting apparatus used for casting, the nip pressure, the surface temperature of cast rollers, and the like are not particularly limited. The temperature is preferably in the range of room temperature to the melting point of the adhesive for the intermediate layer so that the hollow particles can remain undamaged. The temperature is more preferably 20° C. to 150° C. and most preferably 30° C. to 130° C.

A calendering apparatus commonly used in paper making industries, such as a super calender, a soft calender, a gloss calender, a clearance calender, or the like, may be used as the calendering apparatus.

The thickness of the entire image-receiving sheet is preferably 100 μm to 300 μm.

At a thickness less than 100 μm, the mechanical strength and the stiffness of the image-receiving sheet may become insufficient, and curling of the image-receiving sheet that occurs during printing may not be sufficiently prevented.

At a thickness exceeding 300 μm, the number of the image-receiving sheets that can be accommodated in the printer may decrease, or a larger space is desired for the image-receiving sheet storage to accommodate a particular number of sheets, which renders the size reduction of the printer difficult.

A method for making the image-receiving sheet described above will now be described.

The intermediate layer, the barrier layer, the image-forming layer, and other coating layers are formed by existing methods. For example, coating solutions each containing appropriate components are prepared, and the resulting coating solutions are sequentially applied on a particular surface of a sheet-shaped supporting member using a typical coater such as a bar coater, a gravure coater, a comma coater, a blade coater, an air knife coater, a gate roll coater, a die coater, a curtain coater, a lip coater, a slide coater, or the like, and dried.

An example of the thermal transfer sheet will now be described in detail.

First, one embodiment of a transfer-type image-protecting film having an image-protecting layer is described with reference to a cross-sectional view of FIG. 4.

Figure 4:
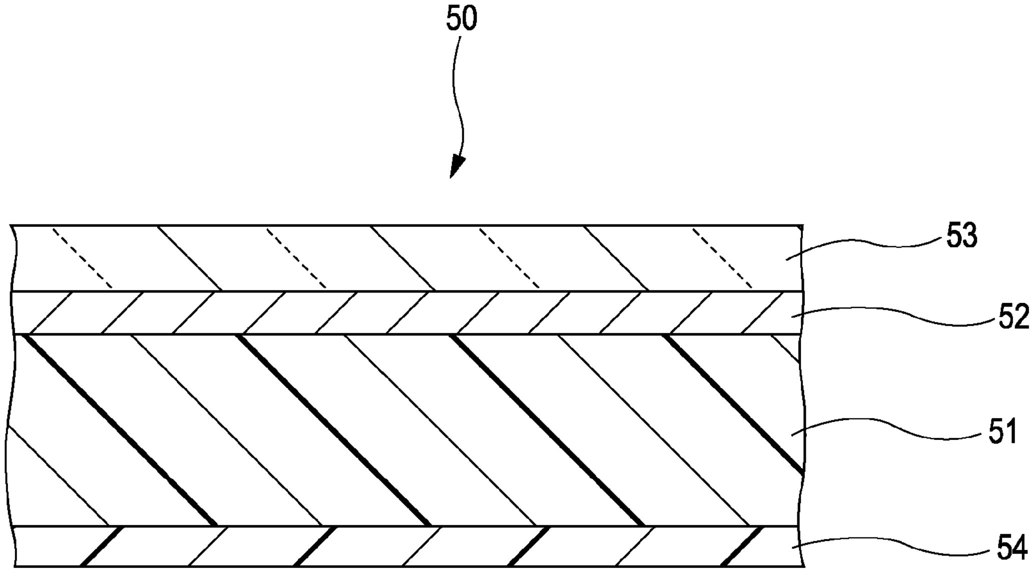
FIG. 4 is a cross-sectional view showing one example of a transfer-type image-protecting film provided with an image-protecting layer.

As shown in FIG. 4, a transfer-type image-protecting film 50 includes a base film 51, a non-transferable peeling layer 52 disposed on the base film 51, and a transparent image-protecting layer 53 disposed on the non-transferable peeling layer 52.

In order to thermally transfer the image-protecting layer 53 onto an image to be protected, the image-protecting layer 53 detaches at the interface between the image-protecting layer 53 and the non-transferable peeling layer 52.

If necessary, a heat-resistant lubricating layer 54 may be disposed at the back of the base film 51 to prevent the transfer-type image-protecting film 50 from fusion-bonding to the thermal transfer head (see FIG. 2) during thermal transfer and to improve the travelling property of the transfer-type image-protecting film 50.

The thickness of the non-transferable peeling layer 52 in the transfer-type image-protecting film 50 is 0.3 μm or more and preferably 1.0 μm to 3.0 μm. In this manner, the glossiness of the surface of the image-protecting layer 53 transferred onto the image to be protected can be improved.

The non-transferable peeling layer 52 may be composed of an existing material that can separate the image-protecting layer 53 at the interface between the non-transferable peeling layer 52 and the image-protecting layer 53 during thermal transfer recording operation. For example, the non-transferable peeling layer 52 may be composed of polyvinyl alcohol or the like.

The transparent thermoplastic resin used in the image-protecting layer 53 is preferably a resin that can satisfactory adhere on the printing paper with an image under heat and pressure. Examples of such a resin include a cellulose acetate butyrate resin, a vinyl chloride-vinyl acetate copolymer, a polyvinyl butyral resin, and a polyester resin.

The image-protecting layer 53 may further contain a common additive such as a photostabilizer or an antistatic agent.

The thickness of the image-protecting layer 53 can be determined according to the type of the thermoplastic resin, the desired degree of adhesive force, edge breaking (tailing) during thermal transfer, and other appropriate factors. In general, the thickness of the image-protecting layer 53 is about 1 μm to 10 μm from the viewpoint of transferability onto the printing paper.

The base film 51 may be any of various existing base members.

Examples of such a base member include a polyester film, a polystyrene film, a polypropylene film, a polysulfone film, a polycarbonate film, a polyvinyl chloride film, a polyethylene film, a polyimide film, an aramid film, a polyoxymethylene film, and a polyamide film.

The thickness of the base film 51 is not particularly limited.

Examples of the material for the heat-resistant lubricating layer 54 include polyvinyl acetal resins, polyurethane, polyimide, polyamide, polyimideamide, cellulose acetate, epoxy resins, polyester resins, polyacrylate resins, polyvinyl acetate resins, styrene acrylate resins, polyurethane resins, polyolefin resins, polystyrene resins, polyvinyl chloride resins, polyether resins, polyamide resins, polycarbonate resins, polyethylene resins, polypropylene resins, polyacrylate resins, polyacrylamide resins, polyvinyl chloride resins, polyvinyl butyral resins, and acetal resins. Among these resins, polyvinyl butyral resins and acetal resins are particularly preferable.

The heat-resistant lubricating layer 54 may further contain a filler of various types, a polyisocyanate compound, and the like as necessary.

The polyisocyanate compound may be any compound containing at least two isocyanate groups per molecule.

Examples of such a polyisocyanate compound include tolylene diisocyanate, 4,4'-diphenylmethane diisocyanate, 4,4'-xylene diisocyanate, hexamethylene diisocyanate, 4,4'-methylenebis(cyclohexyl isocyanate), methylcyclohexane-2,4 (or 2,6)-diisocyanate, 1,3-di(isocyanate methyl)cyclohexane, isophorone diisocyanate, and trimethylhexamethylene diisocyanate; and adducts of polyisocyanate (polyisocyanate prepolymer) prepared by partial addition reaction between a diisocyanate and a polyol, e.g., an adduct obtained by reacting tolylene diisocyanate with trimethylol propane.

A lubricant such as silicone oil, wax, fatty acid amide, a phosphate, or the like may be applied on or added into the heat-resistant lubricating layer 54. A filler may also be added. The heat-resistant lubricating layer 54 may contain a lubricant, an antistatic agent, and the like to improve the travelling property in the printer and prevent adhesion.

Figure 5:
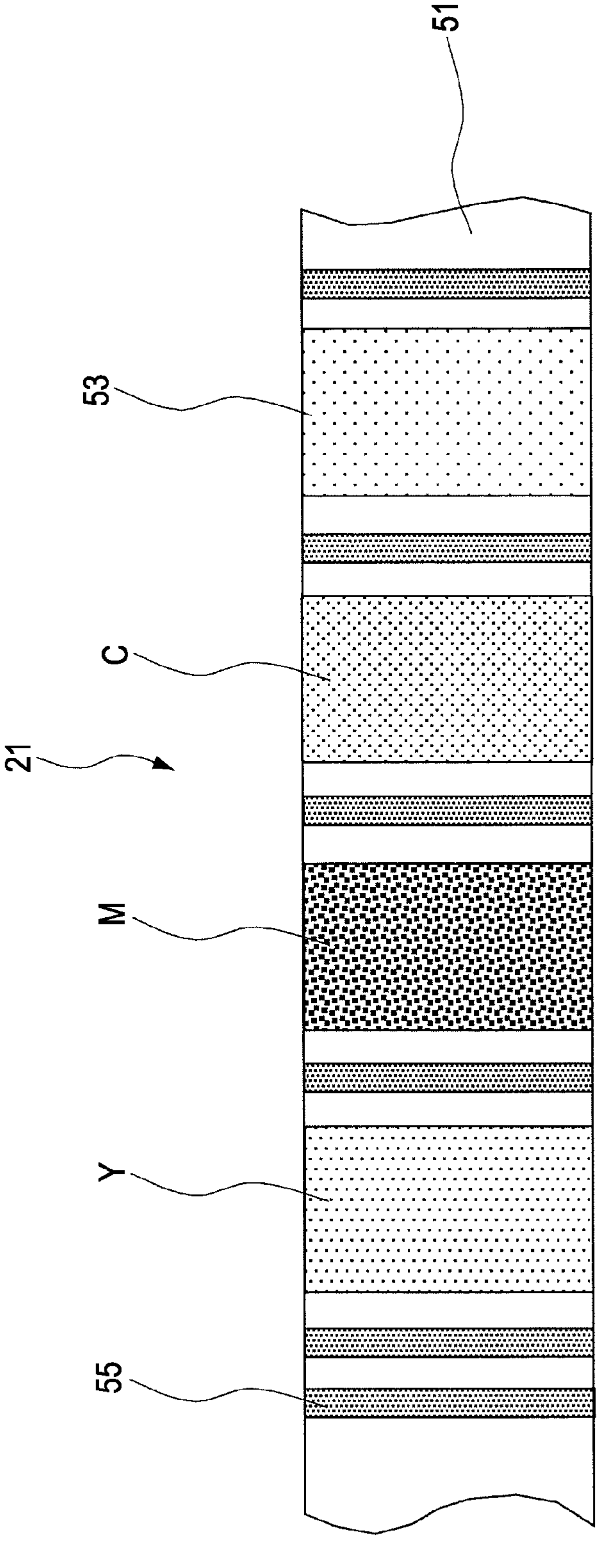
FIG. 5 is a schematic view showing another example of an ink ribbon.

Referring now to FIG. 5, the transfer-type image-protecting film 50 can be incorporated into a part of the ink ribbon (thermal transfer-type ink ribbon) 21.

In the ink ribbon 21, color ink layers, namely, an yellow ink layer Y, a magenta ink layer M, and a cyan ink layer C, and sensor marks 55 are formed sequentially on a plane of the base film 51. The transferable image-protecting layer 53 is also formed on the same plane.

According to this structure, in the process of conducting thermal transfer recording using a printing apparatus (printer) equipped with the ink ribbon 21, the image-protecting layer 53 can be thermally transferred onto an image by using a thermal transfer head of the printing apparatus used for forming the image.

The ink layers of the ink ribbon 21 shown in FIG. 3 may be ink layers for sublimation thermal transfer recording or ink layers for thermofusion thermal transfer recording, and may have the same configurations as those of ink layers of existing ink ribbons.

For example, in the case where the ink layers are for sublimation thermal transfer recording, each ink layer may be made from a dispersion of a sublimation or thermally diffusible dye in any one of cellulose resins such as methyl cellulose, ethyl cellulose, hydroxy ethyl cellulose, hydroxy propyl cellulose, and cellulose acetate; vinyl resins such as polyvinyl alcohol, polyvinyl butyral, polyvinyl acetoacetal, polyvinyl acetate, and polystyrene; and various urethane resins.

Although the yellow ink layer Y, the magenta ink layer M, and the cyan ink layer C sequentially formed in a plane are described above as examples of the ink layers, a black ink layer may be provided in addition or the ink layers may be of a single color.

In sublimation thermal transfer recording, a dye image-receiving layer is sometimes transferred from the ink ribbon to the transfer-receiving object prior to the transfer of image so that an image can be satisfactorily formed on the transfer-receiving object that has no dye image-receiving layer. In the cases where the dye image-receiving layer is transferred as such, a common dye image-receiving layer having thermal transferability may be formed on the same surface of the ink ribbon as the ink layers.

Such a dye image-receiving layer may be made of a thermoplastic resin, a thermosetting resin, a UV curable resin, or the like having good dyeability.

Examples of such a resin include polyester resins, cellulose ester resins, polycarbonate resins, polyvinyl chloride resins, polyvinyl acetate resins, polyamide resins, polyvinyl chloride resins, polystyrene resins, styrene acrylate resins, polyurethane resins, polyamide resins, urea resins, and copolymers of these.

Common dyes can be used as the dyes to be contained in the yellow, magenta, and cyan ink layers.

Examples of the yellow dye include azo dyes, disazo dyes, methine dyes, styryl dyes, and pyridone azo dyes.

Examples of the magenta dyes include azo dyes, anthraquinone dyes, styryl dyes, and heterocyclic azo dyes.

Examples of the cyan dyes include indoaniline dyes, anthraquinone dyes, naphthoquinone dyes, and heterocyclic azo dyes.

Basically, the transfer-type image-protecting film 50 can be formed by applying a coating solution for the non-transferrable peeling layer on the base film 51 by a common application method, drying the applied solution to form the non-transferable peeling layer 52, applying a coating solution for the image-protecting layer on the non-transferable peeling layer 52 by a common application method, and drying the applied solution to form the image-protecting layer 53. The ink layers and the heat-resistant lubricating layer 54 can also be formed by common methods.

Next, a method for forming by transfer an image-protecting layer on a surface of the image-receiving sheet on which an image has been transferred will now be described.

As shown in FIG. 2, the image-receiving sheet (printing paper) 41 is arranged to oppose the thermal transfer sheet (ink ribbon) 21. The thermal transfer head 11 applies thermal energy from the surface of ink ribbon 21 opposite the surface facing the printing paper 41 to form an image. During this process, the thermally transferrable image-protecting layer 53 (refer to FIG. 5) in the thermal transfer sheet (ink ribbon) 21 abuts the surface of the printing paper 41 where the image is formed, and the thermal energy applied by the thermal transfer head 11 from the ink ribbon surface opposite the image-protecting layer 53 thermally bonds and laminates the image-protecting layer 53 onto the surface of the image-receiving sheet (printing paper) 41 where the image is formed.

In heat-bonding the image-protecting layer 53, the amount of thermal energy applied by the thermal transfer head 11 is changed to process the surface of the image-protecting layer 53 to generate glossiness differences.

In transferring the image-protecting layer 53 by using the thermal transfer head 11, the thermal transfer head 11 may be driven on the basis of a lamination printing data so that glossiness differences corresponding to the lamination printing data can be generated and a print with a printing pattern formed in the surface can be obtained.

Examples of the lamination printing data include a repeating pattern of certain characters, a checkerboard pattern, a silk-finish pattern, a matt pattern, an E plane pattern, a fine raster pattern, a promatt pattern, and a certain asperity pattern. In order for the pattern to be clearly identified, at least one of physical asperities and visual asperities created by glossiness difference is desired.

The protective layer is formed by thermally transferring the image-protecting layer 53 after printing of the pattern images (usually in the order of yellow, magenta, and cyan). During this process, various patterns are imparted to achieve various surface properties and to give the surface matt-finish. The matt pattern may be a silk-finish pattern or a random pattern indicated below but more preferably a random pattern to give sense of high grade.

Figure 6A:
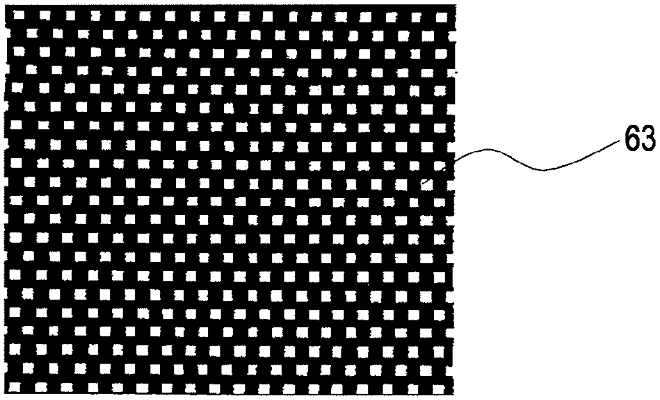
FIGS. 6A and 6B are each a schematic plan view showing an example of an asperity pattern of a protective layer.

As shown in FIG. 6A, a silk-finish pattern is a pattern in which protrusions and recesses are formed in a protective layer 63, transferred on the printing paper, at regular intervals in both horizontal and vertical directions.

In laminating the image-protecting layer 53 (see FIG. 5) of the ink ribbon on a color image by using the thermal transfer head, the silk-finish pattern shown in FIG. 6A is formed to make a protective layer 63 that achieves matt effects. In FIG. 6A, the protrusions and recesses are depicted in black and white. For example, the black portions may correspond to the recesses and the white portions may correspond to the protrusions. Alternatively, the black portions may correspond to the protrusions and the white portions may correspond to the recesses.

Figure 6B:
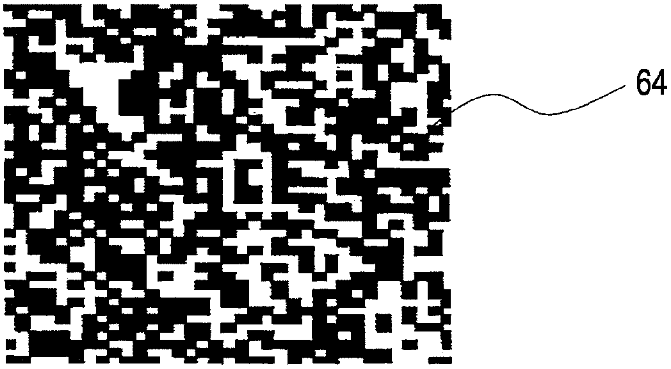

Alternatively, as shown in FIG. 6B, a random pattern shown in the drawing may be created in a computer connected to the printing apparatus or inside the printing apparatus (printer) and then the image-protecting layer may be laminated so that a protective layer 64 having a rough touch equivalent to high-grade printing paper can be obtained.

The drawing in FIG. 6B shows one example of a random pattern in which protrusions and recesses are depicted in black and white. For example, the black portions may correspond to the recesses and the white portions may correspond to the protrusions. Alternatively, the black portions may correspond to the protrusions and the white portions may correspond to the recesses.

Compared to the silk-finish pattern described above, the random pattern gives a better visual effect.

Figure 1:
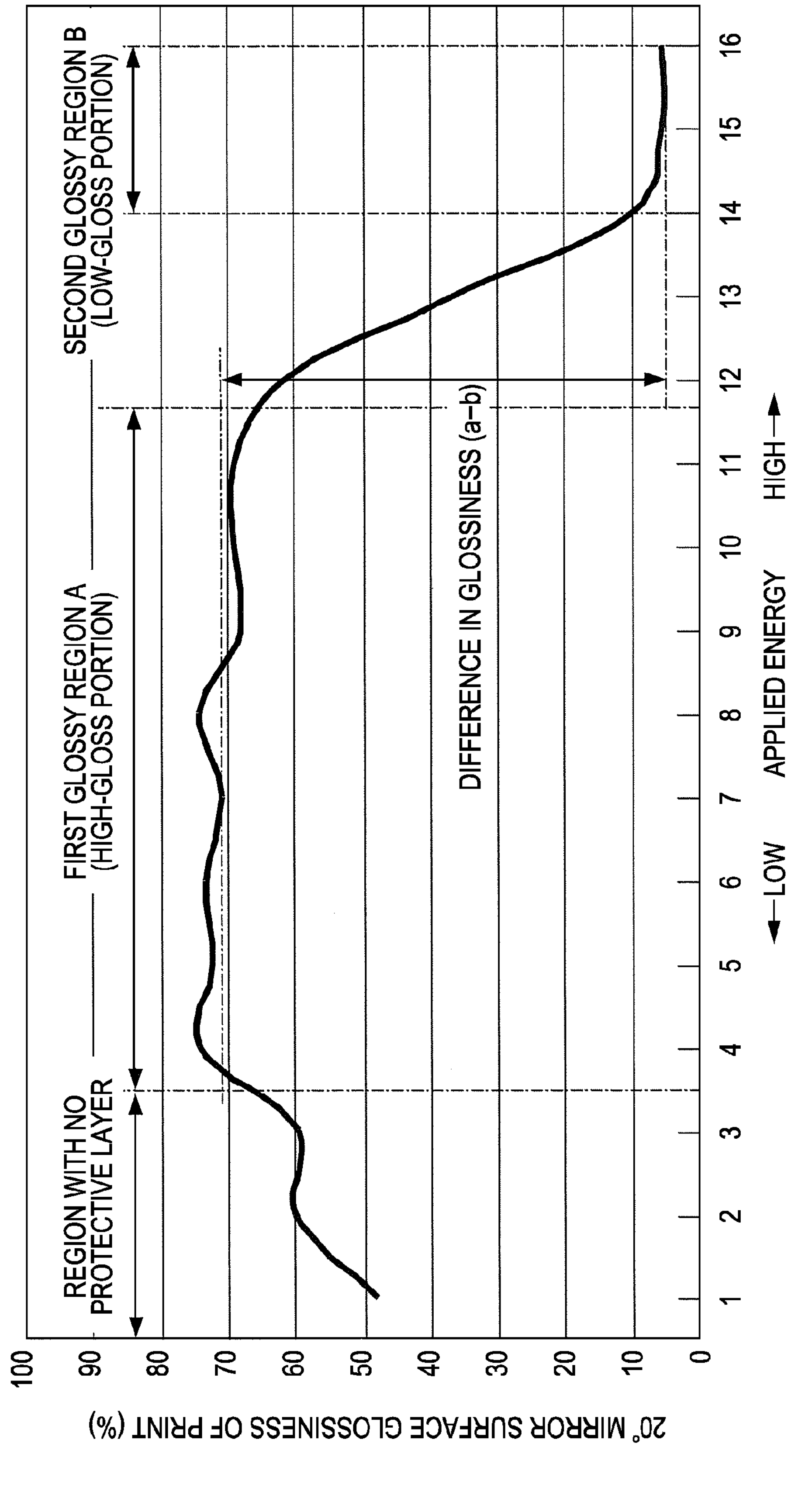
FIG. 1 is a graph showing the relationship between glossiness and applied energy according to one embodiment.

The amount of thermal energy applied by the thermal transfer head 11 (see FIG. 2) is varied so that the difference between a glossiness a of a first glossy region A and a glossiness b of a second glossy region B having a lower glossiness than the first glossy region A is 60 or more. Here, the glossiness is a 20° mirror-surface glossiness measured according to Japanese Industrial Standard (JIS) Z8741, as shown in the graph of FIG. 1 showing the relationship between the glossiness and the applied energy. As a result, the first glossy region A and the second glossy region B different from each other in glossiness are formed in the surface of the image-protecting layer 53 (see FIGS. 3 to 5) thermally bonded on the image surface of the printing paper 41 (see FIG. 2).

In forming the first glossy region A and the second glossy region B in the above-described thermal bonding process, the amount of thermal energy applied by the thermal transfer head 11 is adjusted to at least a level enough for thermally bonding the image-protecting layer 53 onto the image surface of the printing paper 41.

No image-protecting layer 53 is formed in the energy region lower than the first glossy region A. Portions where no image-protecting layer 53 is provided may suffer from degradation of resistance to plasticizers and light and storage stability.

Moreover, in an energy region higher than the second glossy region B, the heat from the thermal transfer head 11 may significantly damage the ink ribbon (thermal transfer sheet) 21, possibly resulting in rupture of the ink ribbon 21, which is not preferable.

Consequently, it is preferable from practical viewpoints to adjust the amount of thermal energy applied from the thermal transfer head 11 to yield a difference in glossiness (a−b) of 60 or more so that the first glossy region A and the second glossy region B different from each other in glossiness are formed in the surface of the image-protecting layer 53 thermally bonded onto the image surface of the printing paper 41. More preferably, the difference in glossiness (a−b) is 65 or more.

Note that when the difference in glossiness (a−b) is less than 60, the print surface appears to be uniformly glossy with no asperities caused by the difference in glossiness and such a print does not have high quality.

According to the process of forming the image-protecting layer 53 described above, the pattern of the protective layer obtained by transferring the image-protecting layer 53 by applying thermal energy derived from an energy profile corresponding to the first glossy region A with a high surface glossiness and the second glossy region B with a low surface glossiness in the print after transfer of the image-protecting layer 53 is used so that the print can easily appear to have asperities.

The graph in FIG. 1 can be obtained by analyzing the energy profile of the first glossy region A, i.e., a high gloss region, and the second glossy region B, i.e., a low gloss region, while changing the energy applied from the thermal transfer head 11 during the transfer of the image-protecting layer 53, for example.

Then, in transferring the image-protecting layer 53, the thermal transfer pattern of the image-protecting layer 53 is formed on the image-receiving sheet surface on the basis of the energy values obtained from the energy profile of the first glossy region A and the second glossy region B. In this manner, the pattern can be formed in the surface of the print without failure.

The speed of conveying the printing paper 41 or the ink ribbon 21 during transfer of the image-protecting layer 53 is preferably low. This is because a clear pattern can be more easily formed in the protective layer formed by transfer of the image-protecting layer 53 at a low speed than at a high speed. A clear surface texture can be formed by taking sufficient time for forming a pattern in the protective layer.

In other words, a sufficient heating time is desirably taken in order to thermally press and thermally set the image-protecting layer 53 and the printing paper 41.

To be more specific, the speed of conveying the printing paper 41 or the ink ribbon 21 is preferably 2.0 msec/line or less and more preferably 4.0 msec/line or less when the dot density of the thermal transfer head is 344 dpi (equivalent to 13.54 dots/μm), for example.

At a speed lower than 4.0 msec/line, the time taken until print out becomes long and this is not desirable under high-speed print out strongly desired in recent years.

The speed of conveying is preferably low because if printing is conducted at a high speed, e.g., 0.7 msec/line, the thermal responsiveness of the thermal transfer head 11 is not sufficient and the heat of the thermal transfer head 11 may not be adequately applied to the protective layer.

According to the above-described method, a clearly visible pattern can be formed in the surface of a print by adjusting the energy applied during the transfer of the image-protecting layer 53 so as to increase the difference in glossiness between the recesses and protrusions formed therein even in the cases where it is difficult to form physical asperities in the surface.

The image-receiving sheet (printing paper) is preferably a layered sheet including a base composed of a paper material, an intermediate layer containing hollow particles, and an image-receiving layer stacked sequentially in that order, as described above.

Use of this image-receiving sheet improves the texture of the print from when a film base sheet is used, and a print that has a texture similar to silver halide photos can be obtained.

Next, a print was formed by using the ink ribbon described with reference to FIG. 5 under the conditions same as those for measuring the thermal properties of the image-receiving sheet (printing paper) described with reference to FIG. 1.

Meanwhile, the conditions of conveying the image-receiving sheet (printing paper) during print formation and lamination of the image-protecting layer were changed between 0.7 msec/line (high speed) and 4 msec/line (low speed), and the surface textures of the prints were observed.

During formation of the image-protecting layer, the energy applied by the thermal transfer head was given a pattern so that the low energy portion corresponds to A and the high energy portion corresponds to B to thereby form a surface with a desired pattern.

The results are shown in Table 1.

TABLE 1

| Image-receiving sheet | 20° glossiness a in first glossy region (%) | 20° glossiness b in second glossy region (%) | Difference in glossiness (a − b) (%) | Conveying rate during transfer of image-protecting layer (msec/line) | Sense of asperities after transfer of image-protecting layer | Texture similar to that of silver halide photos | General rating |
|---|---|---|---|---|---|---|---|
| Image-receiving sheet for UP-CR10L (Hollow particle-containing paper base) | 70 | 5 | 65 | 4.0 (low speed) | G | G | G |
| Image-receiving sheet 1 (Hollow particle-containing paper base) | 70 | 7 | 63 | ↑ | G | G | G |
| Image-receiving sheet for UP-CR10L (Hollow particle-containing paper base) | 69 | 9 | 60 | 2.0 (intermediate speed) | F | G | F |
| Image-receiving sheet for UP-DR150 (Plastic base) | 82 | 15 | 67 | 4.0 (low speed) | G | P | P |
| Image-receiving sheet for UP-CR10L (Hollow particle-containing paper base) | 68 | 16 | 52 | 0.7 (high speed) | P | G | P |
| Image-receiving sheet for UP-CR10L (Hollow particle-containing paper base) | 55 | 9 | 46 | 4.0 (low speed) | P | G | P |

The glossiness described in the table was measured with a 20° gloss meter (VG 2000 produced by Nippon Denshoku Kogyo Co., Ltd.) in regions corresponding to A and B in FIG. 1 in an image-protecting layer printed in yellow according to a 16 gray scale, and rated.

The standards of sensory rating was as follows.

Sense of asperities after transfer of image-protecting layer

G: Clear sense of asperities.

F: Sense of asperities was slightly unclear.

P: Sense of asperities was unclear.

Texture

G: Texture similar to that of silver halide photos.

F: Texture slightly different from that of silver halide photos.

P: Texture greatly different from that of silver halide photos.

General Rating

G: Both sense of asperities and texture were G.

F: Sense of asperities G and texture F or sense of asperities F and texture G.

P: Both sense of asperities and texture were P or one of sense of asperities and texture was P.

If the sheet is G or F in the general rating, the sheet is within a practical range.

In Table 1, "sense of asperities" means the sense of asperities in the surface of the protective layer formed by thermally transferring the image-protecting layer onto an image-receiving sheet (print); and "physical asperities" and "visual asperities created by differences in glossiness" are factors involving the actual sense of asperities observed with naked eye. A sample of a print laminated with the image-protecting layer in which the difference (a−b) between the glossiness a in the high gloss region A and the glossiness b in the low gloss region B is 60 or higher in terms of 20° mirror surface glossiness measured according to JIS Z 8741 and a sample in which UP-DR150 image-receiving sheet is used as a bonded plastic base developed strong sense of surface asperities.

The speed of conveying the image-receiving sheet is preferably 2.0 msec/line or less and more preferably 4.0 msec/line or less.

According to the "texture similar to silver halide photos" column of Table 1, a sample constituted by an image-receiving sheet with a paper base and an intermediate layer containing a hollow particle layer exhibited a texture similar to silver halide photos whereas a sample constituted by the image-receiving sheet including a bonded plastic base, e.g., the image-receiving sheet for UP-DR150, produced a print having a texture different from that of silver halide photos.

Among thermal transfer sheets listed in Table 1, those having a difference (a−b) between the glossiness a in the first glossy region A in FIG. 1 and the glossiness b in the second glossy region B of less than 60 could not form clear patterns on a print and caused quality degradation.

According to the method for producing a print with a pattern having differences in glossiness described above, a high-quality print having a texture similar to that of silver halide photos can be easily produced. The method has high practical utility.

The conditions for the method for producing a print relevant to Table 1 are described below.

The printer used was UP-DR150 (produced by Sony Corporation).

The thermal transfer sheets used were thermal transfer sheets for UP-DR150, namely, 2UPC-R153H, 2UPC-R154H, 2UPC-R155H, and 2UPC-R156H produced by Sony Corporation.

The dot density was 344 dpi (equivalent to 13.54 dots/mm).

The types of image-receiving sheets used were image-receiving sheets for UP-DR150 (image-receiving sheet with film base members, produced by Sony Corporation), and image-receiving sheets for UP-CR10L (image-receiving sheets with cellulose pulp bases containing hollow particle-containing intermediate layer), namely 2UPC-C13, 2UPC-C14, and 2UPC-C15 (trade names) produced by Sony Corporation.

The speed of conveying the image-receiving sheet was 0.7 msec/line, i.e., 10.54 cm/sec, in a high speed mode and 4 msec/line, i.e., 1.85 cm/sec, in a low speed mode.

As for the conditions for applying thermal energy from the thermal transfer head, the same thermal transfer film was used and half tone images were formed. For example, a total of 16 steps respectively corresponding to 16 gray scale levels were performed. The energy applied was gradually increased from the 1st gray scale level to the 16th gray scale level. It should be noted that zero on the horizontal axis in FIG. 1 corresponds to an unprocessed blank sheet.

During this process, the strobe pulse width at a low conveying rate mode (4 msec/line) was adjusted so that the same recording density property as in a high conveying rate mode (0.7 msec/line) was achieved for each gray scale level.

As a result, as shown in FIG. 1, the relationship between the energy applied during transfer of the image-protecting layer and the glossiness (the mirror surface glossiness (%) of prints for every print gray scale level) was determined.

Each of the prints on which the image-protecting layers were transferred was analyzed to determine the glossiness.

Note that the image-protecting layer could be transferred in an energy region beyond the energy of the first glossy region A (high gloss) shown in FIG. 1.

The applied energy profile used for transferring the image-protecting layer was the same as that used for transferring yellow dye during formation of images.

There was a gray scale level at which the transfer of the image-protecting layer became possible. The region at the lower gray scale side of this gray scale level was defined as "nontransferable energy region" and the region at the higher gray scale side of this gray scale level was defined as "transferrable energy region".

In the description described above, the image-protecting layer was laminated by using a thermal transfer sheet with an image-protecting layer transfer sheet incorporated therein. Alternatively, it is possible to laminate the image-protecting layer on an image on an image-receiving sheet by using an image-protecting layer transfer sheet which is a separate sheet from the thermal transfer sheet.

It should be understood by those skilled in the art that various modifications, combinations, sub-combinations and alterations may occur depending on design requirements and other factors insofar as they are within the scope of the appended claims or the equivalents thereof.

What is claimed is:

1. A method for producing the print, the method comprising thermally bonding a thermally transferable image-protecting layer onto an imaged surface of an image-receiving sheet so as to form a protective layer, wherein, thermal energy applied during bonding is changed so that the protective layer has a first glossy region and a second glossy region, the second glossy region having a glossiness lower than that of the first glossy region, the first glossy region has a glossiness a, of a 20° mirror-surface glossiness measured according to Japanese Industrial Standard Z8741 (1997), the second glossy region has a glossiness b, of a 20° mirror-surface glossiness measured according to Japanese Industrial Standard Z8741 (1997), and the value obtained by subtracting the glossiness b from the glossiness a is 60 or more, wherein the image-receiving sheet includes: a base composed of a paper material; an intermediate layer containing hollow particles, and an image receiving layer, which are stacked in that order.

2. The method according to claim 1, wherein an amount of the thermal energy applied to form the first glossy region and the second glossy region is at least large enough to thermally bond the image-protecting layer onto the image surface of the image-receiving sheet.

3. The method according to claim 1, further comprising having a thermal transfer sheet where an image is transferred from the thermal transfer sheet to an image-receiving layer of the image receiving sheet followed by the thermal transfer of the image protective layer onto the image, wherein, the image-protecting layer is formed on part of the thermal transfer sheet from which the image is transferred to the image-receiving sheet.

4. The method according to claim 1, wherein the value obtained by subtracting the glossiness b from the glossiness a is 65 or more.

* * * * *